(12) United States Patent
Jaschinski et al.

(10) Patent No.: US 6,987,181 B2
(45) Date of Patent: *Jan. 17, 2006

(54) OXIDIZED POLYMERIC CARBOHYDRATES AND PRODUCTS MADE THEREOF

(75) Inventors: Thomas Jaschinski, Mannheim (DE); Susanna Gunnars, Sundsvall (SE); Arie Cornelis Besemer, Amerongen (NL); Petter Bragd, Gothenburg (SE)

(73) Assignee: SCA Hygiene Products GmbH, Mannheim (DE)

( * ) Notice: Subject to any disclaimer, the term of this patent is extended or adjusted under 35 U.S.C. 154(b) by 200 days.

This patent is subject to a terminal disclaimer.

(21) Appl. No.: 10/437,117

(22) Filed: May 14, 2003

(65) Prior Publication Data

US 2004/0010137 A1 Jan. 15, 2004

Related U.S. Application Data (62) Division of application No. 09/707,971, filed on Nov. 8, 2000, now Pat. No. 6,635,755.

(30) Foreign Application Priority Data

Nov. 8, 1999 (DE) .......................... 199 53 589

(51) Int. Cl.
    C08B 37/00 (2006.01)

(52) U.S. Cl. .................... 536/56; 536/18.7; 536/30; 536/45; 536/47; 536/55.1

(58) Field of Classification Search .................. 536/56, 536/18.7, 30, 45, 47, 55.1
    See application file for complete search history.

(56) References Cited

U.S. PATENT DOCUMENTS

| | | | |
|---|---|---|---|
| 3,086,969 A | 4/1963 | Slager | |
| 3,137,588 A | 6/1964 | Taylor | |
| 3,313,641 A | 4/1967 | Borchert | |
| 3,431,254 A | 3/1969 | Klug | |
| 3,608,559 A | * 9/1971 | Briskin et al. ............... 131/359 |
| 4,082,743 A | 4/1978 | Hearon et al. | |
| 4,100,341 A | 7/1978 | Brasey et al. | |
| 4,647,505 A | 3/1987 | Blackie et al. | |
| 4,972,018 A | 11/1990 | Leadbetter | |
| 4,983,748 A | 1/1991 | Tsai et al. | |
| 5,334,756 A | 8/1994 | Likibi et al. | |
| 5,348,621 A | 9/1994 | Rudy, deceased | |
| 5,416,215 A | 5/1995 | Buschken et al. | |
| 5,472,485 A | 12/1995 | Pandian et al. | |
| 5,629,426 A | 5/1997 | Pastor et al. | |
| 5,739,352 A | 4/1998 | Barner et al. | |
| 5,821,374 A | 10/1998 | Jenny et al. | |
| 5,849,929 A | 12/1998 | Volodarsky et al. | |
| 5,873,979 A | 2/1999 | Naieni | |
| 5,877,330 A | 3/1999 | Kishimoto et al. | |
| 6,103,059 A | 8/2000 | Call | |
| 6,228,126 B1 | 5/2001 | Cimecioglu et al. | |
| 6,331,619 B1 | * 12/2001 | Besemer et al. ............. 536/105 |
| 6,379,494 B1 | * 4/2002 | Jewell et al. ................... 162/9 |
| 6,635,755 B1 | * 10/2003 | Jaschinski et al. ............ 536/56 |

FOREIGN PATENT DOCUMENTS

| | | |
|---|---|---|
| DE | 4432795 | 3/1996 |
| DE | 198 21 263 | 11/1998 |
| DE | 197 23 912 | 12/1998 |
| DE | 197 46 805 | 4/1999 |
| EP | 0283951 | 9/1988 |
| EP | 0324382 | 7/1989 |
| EP | 0574666 | 12/1993 |
| EP | 0574667 | 12/1993 |
| EP | 0752024 | 1/1997 |
| EP | 0775684 | 5/1997 |
| EP | 0801073 | 10/1997 |
| EP | 0866060 | 9/1998 |
| GB | 1299646 | 12/1972 |
| GB | 1385894 | 3/1975 |
| GB | 2289695 | 11/1995 |
| HU | P9901784 | 10/1999 |
| JP | 50054684 PN | 5/1975 |
| JP | 63-211399 | 9/1988 |
| JP | 2-99695 | 4/1990 |
| JP | 6-17399 | 1/1994 |
| JP | 8-003136 | 1/1996 |
| JP | 10-072501 | 3/1998 |
| JP | 10-251302 | 9/1998 |

(Continued)

OTHER PUBLICATIONS

T. P. Nevell et al. Cellulose Chemistry and Its Applications, Ellis Horwood Limited, Chichester, 1985, pp. 5–6, 151–29, 223–242, 243–265, 345–362, 363–383, 384–422 and 505–530.

Pahn S. Chang et al., "Oxidation of Primary Alcohol Groups of Naturally Occuring Polysaccharides with 2,2,6, 6–Tetramethyl–1–Piperidine Oxoammonium Ion," J. Carbohydrate Chemistry, V. 15, 1996, pp. 819–830.

Philip Luner et al., "The Effect of Chemical Modification on the Mechanical Properties of Paper," TAPPI, V. 50, 1967, pp. 37–39.

OTHER PUBLICATIONS

*Primary Examiner*—James O. Wilson
*Assistant Examiner*—Patrick Lewis
(74) *Attorney, Agent, or Firm*—Young & Thompson (57) ABSTRACT

The present invention relates to a polysaccharide having functional groups, wherein said groups are aldehyde groups formed at positions C2 and/or C3 as well as at position C6 of the anhydroglucose units of the polysaccharide chain. Preferably the polysaccharide is a cellulosic fibrous material whose primary and secondary hydroxyl groups of the cellulose are oxidized into aldehyde groups at least in part by means of TEMPO oxidation and periodate oxidation.

The invention also concerns a paper or nonwoven comprising the above polysacaride. According to the invention a relative wet strength of more than 10% can be achieved.

18 Claims, 3 Drawing Sheets

FOREIGN PATENT DOCUMENTS

| | | |
|---|---|---|
| JP | 11-12301 | 1/1999 |
| SE | 510528 | 5/1999 |
| SU | 592905 | 2/1978 |
| SU | 1268248 | 7/1986 |
| SU | 1268649 | 7/1986 |
| SU | 1268650 | 11/1986 |
| WO | 94/16750 | 8/1994 |
| WO | 94/29510 | 12/1994 |
| WO | 95/07303 | 3/1995 |
| WO | 95/11340 | 4/1995 |
| WO | 95/25844 | 9/1995 |
| WO | 96/36621 | 11/1996 |
| WO | 96/38484 | 12/1996 |
| WO | 97/36037 | 2/1997 |
| WO | 97/31951 | 9/1997 |
| WO | 97/36037 | 10/1997 |
| WO | 97/36051 | 10/1997 |
| WO | 97/36052 | 10/1997 |
| WO | 97/36053 | 10/1997 |
| WO | 97/36054 | 10/1997 |
| WO | 98/27117 | 6/1998 |
| WO | 99/23117 | 5/1999 |
| WO | 99/23240 | 5/1999 |
| WO | 01/29309 | 4/2001 |

OTHER PUBLICATIONS

Raymond A. Young, "Bonding of Oxidized Cellulose Fibers and Interaction with Set Strength Agents," Wood and Fiber, V. 10, 1978, pp. 112–119.

T. Kitaoka et al., "Chemical modification of pulp fibers by TEMPO–mediated oxidation," Nordic, Pulp and Research Journal, SE, Sweden, vol. 14, No. 4, 1999, pp. 279–284.

W.M. Hearon et al., "Chemicals from Cellulose," No. 28, pp. 77–84, Appl. Polym. Symp. 1975.

A.E.J. De Nooy, "Selective oxidation of primary alcohol groups in polysaccharides," 1997, pp. 1–104.

T. Miyazawa et al., "Selective Oxidation of Alcohols by Oxaminium Salts," J. Org. Chem., 1985, vol. 50, No. 8, pp. 1332–1334.

I. McAlpine, Das Papier, Heft 7, 1986, "Die Rolle von Ammonium–zirkoniumkarbonat fur Papier und Pappebeschichtungen," pp. 2–7, (contas English abstract).

C. Chirat et al., "Heat– and Light–Induced Brightness Reversion of Bleached Chemical Pulps," Journal of Pulp and Paper Science, vol. 25, No. 6, 1999, pp. 201–205.

N.J. Davis et al., "Selective Oxidation of Monosaccharide Derivatives to Uronic Acids," Tetrahedron Letters, vol. 34, No. 7, pp. 1181–1184, 1993.

P.S. Chang et al., "Oxidation of Primary Alcohol Groups of Naturally Occurring Polysaccharides with 2,2,6, 6–Tetramethyl–1–Piperidine Oxoammonium Ion," 15(7), 1996, pp. 819–830.

A. Isogai et al., "Preparation of polyuronic acid from cellulose by TEMPO–mediated xodation," Cellulose, 1998, 5, pp. 153–164.

S.H. Zeronian et al., "The Mechanical Properties of Paper Made from Periodate Oxycellulose Pulp and from the Same Pulp after Reduction with Borohydride," TAPPI, vol. 47, No. 9, 1964, pp. 557–564.

B. Alince, "Development of paper tensile strength by Periodate oxidation," Svensk Papperstidning, No. 7, 1995, pp. 253–257.

P.J. Borchert et al., "Cationic Dispersions of Dialdehyde Starch," TAPPI, Sep. 1964, vol. 47, No. 9, pp. 525–528.

E.S. Putnam, "The Exchange Reaction Between Calcium and Carboxyl Groups in Cellulose," TAPPI, Sep. 1964, vol. 47, No. 9, pp. 549–554.

J. Mirza et al., Cationic Dispersion of Dialdehyde Starch, TAPPI, Sep. 1964, vol. 47, No. 9, pp. 583–586.

M.L. Wolfram et al., "Alkaline Hypochlorite Oxidation of Cellulose Analogs," TAPPI, Apr. 1964, vol. 47, No. 4, pp. 189–192.

N.S. Thompson et al., "Some Chemical and Physical Properties of Pulps Prepared by Mild Oxidative Action," TAPPI, Mar. 1964, vol. 47, No. 3, pp. 157–162.

TAPPI, 1964, vol. 47, No. 4, pp. 100A, 104A and 107A, 1964 Pulp Bleaching Conference. O. Theander, "Carbonyl Glucosides, Formation and Properties," K.V. Sarkanen et al., "Kinetics of Hypochlorite Oxidation of Cellulose and Cellulose Models in the pH range of 5 to 10".

G. Broughton et al., "The Mechanical Properties of Paper—Part II," TAPPI, vol. 37, No. 2, 1954, pp. 72–78.

R.A. Plunkett, "Estimation of Deploymerization in Dialdehyde Starch Dispersions," TAPPI, vol. 51, No. 4, 1968, pp. 152–155.

J.W. Daniel, "The Hypothesized Carbonic Acid Ester Linkages in Cellulose Oxidized by Aqueous Chlorine at pH 4.5," TAPPI, vol. 42, No. 7, 1959, pp. 534–544.

C.R. Pottenger, "The Mechanism of Cerium (IV) Oxidation of Glucose and Cellulose," TAPPI, vol. 51, No. 11, 1968, pp. 544.

L.E. Wise, "Chemically Modified Cellulose," Wood Chemistry, Reinhold Publishing Corp., 1946, Chapter 6, pp. 141–152.

E. Sjostrom et al., "The Influence of Carboxyl and Carbonyl Groups on the Brightness Stability of Belached Pulps," TAPPI, vol. 51, No. 1, 1968, pp. 16–19.

L. Wagberg et al., "Physicochemical characterization of papermaking fibres," Transactions of the $11^{th}$ Fundamental Research Symposium held at Cambridge, Sep. 1997, pp. 43–55.

S. Katz et al., "The determination of strong and weak acidic groups in sulfite pulps," Svensk Papperstidning, No. 6, 1998, pp. R48–R53.

L. Wagberg et al., "Charge determination of porous substrates by polyelectrolyte adsorption," Nordic Pulp and Paper Research Journal, No. 2, 1989, pp. 71–76.

D. Horten et al., "Preparation of Unsubstituted 6–Aldehydocelluloses by Photolysis of 6–Azido–6–Deoxycelluloses," Carbohydrate Research 26 (1973), pp. 1–19.

J. Pastyr et al., "Preparation and Uses of 3–Amino–2–hydroxypropyl Cellulose," Abstract Bulletin about Institute of Paper and Science Technology Inc. 60 (1989) Oct., No. 4.

J. Hamuro, Chemical Abstracts, vol. 83, No. 20, 1975, Abstract No. 166084 and JP–A–50/054684, Ajinomoto Co., "Polyaldehydes."

M. Pagliaro, "Autocatalytic oxidations of primary hydroxyl groups of cellulose in phosphoric acid with halogen oxides," Carbohydrate Research 308 (1998), pp. 311–317.

* cited by examiner

OXIDIZED POLYMERIC CARBOHYDRATES AND PRODUCTS MADE THEREOF

FIELD OF THE INVENTION

The invention relates to oxidized polymeric carbohydrates and products made thereof. The invention particularly relates to oxidized cellulosic fibrous materials and polysaccharides such as starch.

The cellulosic fibrous material, which is usually known as pulp and which can be used as a starting material in accordance with an embodiment of the invention, is normally used to make paper or nonwoven products. It is mainly composed of cellulose that is obtained from plant cells and that may more or less contain a number of accompanying substances.

The accompanying substances may relate e.g. to lignin, which—in addition to cellulose—represents a main component in lignified plant cells.

In the case of chemical pulping processes, however, the lignin may be dissolved in an approximately quantitative manner, whereby cellulose and, depending on the pulping process, also hemicelluloses are left behind. As an industrial product that is obtained from lignified plant parts by means of chemical pulping, cellulose is generally referred to as pulp. Cellulose also occurs in a purer form, e.g. in cotton or linters. Usually just purification or removal of fats and waxes is needed to recover the cellulose, because these plant fibers contain next to no lignin.

A paper of an untreated cellulose-containing fibrous material usually loses 95% to 97% of its dry strength when saturated with water, so that it normally cannot be used in the moistened or wet states. This is due to the fact that paper products to an extent develop a dry strength as a result of inter-fiber hydrogen bonds. If the paper product is moistened, the water breaks up the hydrogen bonds and therefore reduces the strength of the paper product.

There are two important techniques for increasing the wet strength of paper products that have already been in use for some time. One technique prevents the water from reaching and breaking up the hydrogen bonds, e.g. by coating the paper product with a water-repellent material. The second approach is to provide the paper product with additives or reagents that promote the formation of inter-fiber bonds.

To increase the wet strength according to the first technique, poly(ethylene imines), polyamide epichlorohydrin resins and urea or melamine formaldehyde condensates are for example used as wet-strength agents. The use of such synthetic resins results in permanent wet strength. On the other hand, however, enhanced wet strength can also be achieved by addition of water-soluble starches or starch derivatives. This effect is nevertheless only temporary and decreases as soon as the starch derivative dissolves. Apart from the aforementioned additives, modified soluble cellulose derivatives are used as wet-strength agents. In this way, for example, the addition of carboxymethyl cellulose is usual as an additive besides the aforementioned polyamide epichlorohydrin resins.

DESCRIPTION OF THE RELATED ART

To bond cellulose fibers together according to the second technique, thereby increasing the strength, U.S. Pat. No. 5,873,979 teaches the reaction of the cellulose's hydroxy functions with a C2–C9 dicarboxylic acid.

Modified techniques for increasing the strength of paper in the wet state are taught in the following applications filed by the Procter & Gamble Company: WO 97/36051, WO 97/36053, WO 97/36037, WO 97/36054 and WO 97/36052.

WO 97/36051 describes paper that exhibits a temporary wet strength and which is obtained by linking a polyhydroxy polymer (e.g. cellulose) to 1,2-disubstituted alkene carboxylic acid, oxidative cleavage of the double bond of the alkene carboxylic acid into aldehyde functions and crosslinking the hydroxy groups of the polyhydroxy polymer with the aldehyde functions.

WO 97/36053 describes a paper product exhibiting temporary wet strength and comprising (a) cellulosic fibers and (b) a binder which has (b–i) a polyaldehyde polymer and (b–ii) a water-soluble polysaccharide with cis-OH groups.

WO 97/36037 describes the aldehyde-modified cellulosic fibers upon which the paper product according to WO 97/36051 is based.

WO 97/36054 discloses a compound that bestows temporary wet strength on paper products and which comprises the ozone oxidation product (containing aldehyde groups) of a polysaccharide in which the OH groups in at least one recurrent unit of the polysaccharide are OH groups in cis position. This document also describes a paper product that comprises cellulosic fibers in combination with the above compound and a method of producing the compounds of the paper product.

WO 97/36052 describes a paper product exhibiting initial wet strength and comprising (a) cellulosic fibers having free aldehyde groups originating from cellulosic fibers that include a polysaccharide (preferably galactose and/or mannose) in which the OH groups of least a part of the recurrent units are OH groups in cis position, in combination with (b) a water-soluble polymer having functional groups that can react with the aldehyde groups.

Since cellulose exhibits OH groups in trans position, it is not meant with the polysaccharide defined under item (a) and the hemicellulose portion of pulps that have a high proportion of hemicellulose is to be oxidized and the oxidation product used as a "binder". Hemicelluloses are derived from (poly)saccharides with OH groups in cis position (e.g. galactose, mannose) that can be rapidly oxidized into aldehyde groups and which can then form (hemi) acetal bonds in accordance with the teaching of this document, such bonds holding the paper product together.

Oxidized starch is known in addition to oxidized cellulose products. For instance, DE-A-197 46 805 discloses a starch that is oxidized at the C6 carbon atom of the glucose units, and discloses its use as a super-absorber, as a seed and fertilizer carrier, as a soil ameliorant, as a material in galenics or as an adhesive and binder. According to U.S. Pat. No. 3,137,588, a starch that contains COOH groups can be obtained by hypochlorite oxidation. After crosslinkage with a metal (Zr, Ti), this produces a water-insoluble coating of cellulosic tissue.

DE-A-1,241,433 and DE-A-1,211,142 both disclose dialdehyde polysaccharides such as dialdehyde starch or cellulose containing aldehyde functions at C2 and C3.

BRIEF SUMMARY OF THE INVENTION

The invention's object is to improve the strength of carbohydrate networks.

Figure 1:
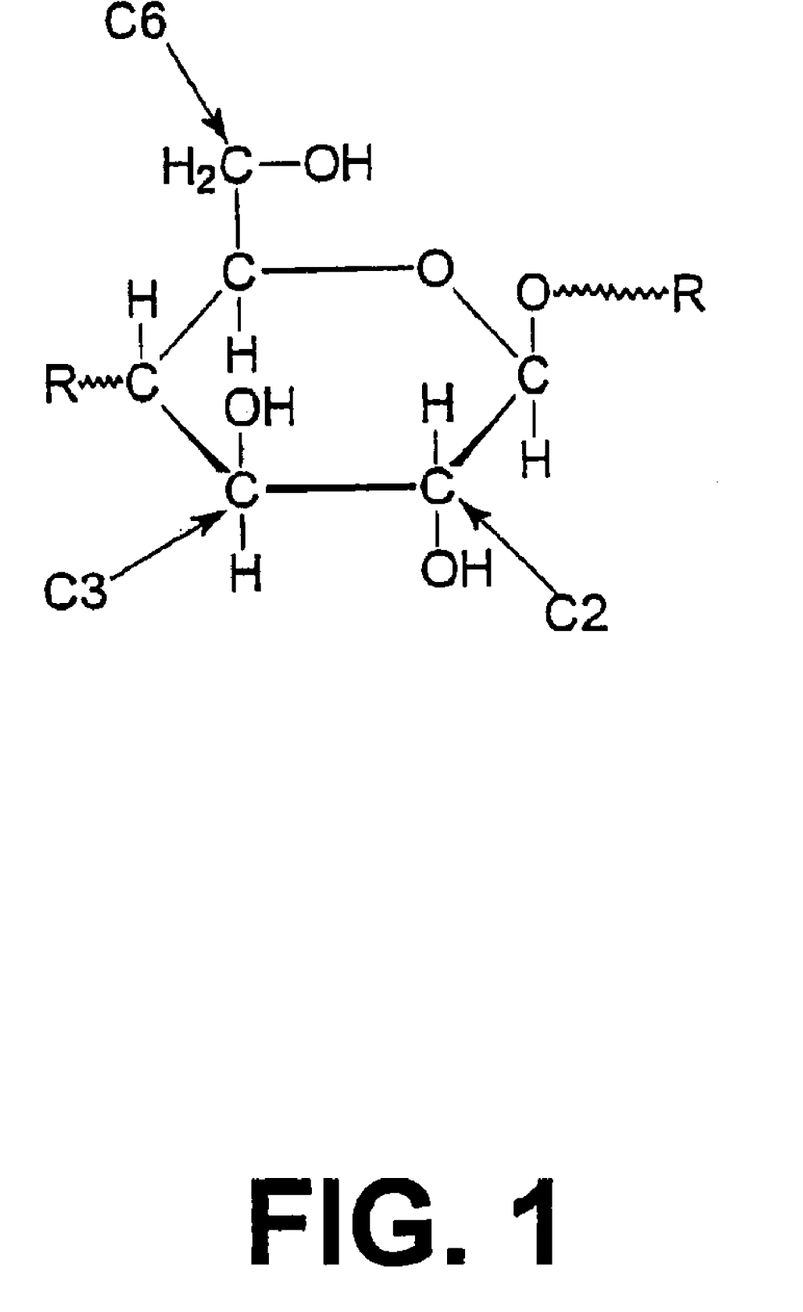
FIG. 1 is the formula for a polymeric carbohydrate with functional groups, according to the invention.

This object is solved by a polymeric carbohydrate with functional groups, such groups relating to aldehyde groups formed at positions C2 and/or C3 as well as at position C6 (corresponding to FIG. 1) of the anhydroglucose units of the polysaccharide chain, as well as by paper and nonwoven (products) obtained therefrom such as tissue (products). In the accompanying drawings:

DETAILED DESCRIPTION OF THE INVENTION

The oxidized polysaccharide or polysaccharide-based material of the invention comprises aldehyde groups formed at positions C2 and/or C3 as well as at position C6 of the anhydroglucose units of the polysaccharide chain.

The term "polysaccharide" denotes a pure carbohydrate, such as starch or cellulose, whereas "polysaccharide-based material" refers to materials containing a polysaccharide as a major component, e.g. pulp, the major component of which is α-cellulose. Hereinafter, unless stated otherwise, the term "polysaccharide" encompasses both of the above.

The term "polysaccharide" is also intended to distinguish the claimed carbohydrates from oligosaccharides which are typically obtained by condensation of 2 to about 7 monosaccharide units.

According to a preferred embodiment the polysaccharide comprises aldehyde groups at positions C2, C3 and C6 of at least some anhydroglucose units of the polysaccharide chain.

These aldehyde groups are obtained by complete or partial oxidation of the primary and/or secondary hydroxyl groups of the anhydroglucose units so as to produce a polymeric carbohydrate that may also exhibit trialdehyde anhydroglucose units.

In a preferred embodiment, a partial oxidation has taken place rather than oxidation of both secondary OH groups and the primary OH group of an anhydroglucose unit of a carbohydrate chain comprising a plurality of consecutive anhydro sugar units into aldehyde groups.

In a further embodiment, the polysaccharide units are partially not oxidized.

The total content of aldehyde groups of the polysaccharide of the invention is preferably greater than 50, more preferably greater than 75, in particular greater than 100 µmol aldehyde/g, particularly greater than 150 µmol aldehyde/g dry weight of the polysaccharide (unless stated otherwise, the term "dry weight" means oven-drying at 105° C for 6 hrs until a constant weight is reached). Even greater preference is given to values of greater than 200 µmol aldehyde/g, particularly greater than 250 µmol aldehyde/g dry weight.

If the polysaccharide-based material has a fibrous structure, such as in pulp, the total content of surface aldehydes is preferably greater than 10, 25, 50, 75, 100, and 125 µmol aldehyde/g with increasing preference in this order.

Preferably the total number of aldehyde groups is greater, especially more than 1.5 times greater than the total number of carboxyl groups.

The content of oxidized groups in the polysaccharide according to the invention can be analytically determined as explained in the section "examples".

According to the invention it possible that positions other than C2 and/or C3 as well as position C6 of the anhydro-glucose units are also oxidized, though to a lesser extent. Thus a primary oxidation of alcohol groups and a glycolic oxidation (e.g. at C3 and C4) may occur. It is preferred that the content of other aldehyde functions (other than at positions C2 and/or C3 as well as C6) account for less than 20%, more preferably less than 10%, in particular less than 5% of the total aldehyde content measured.

According to one aspect, the invention makes available a cellulosic fibrous material, such as pulp, wherein the primary (C6) and secondary (C2 and/or C3) hydroxyl groups of the cellulose chain are at least partially oxidized into aldehyde groups, preferably by means of a combined TEMPO oxidation and periodate oxidation. Such oxidized cellulosic fibrous material, e.g. oxidized pulp exhibits heightened initial wet strength, and partially also an increased dry strength (in this context the term "strength" means the strength of paper or nonwoven formed from the oxidized material; for the measurement of dry and wet strength please refer to the section "Examples").

An oxidized cellulosic fibrous material, as a preferred embodiment of the invention, preferably displays the following strength parameters:

a breaking length (dry) of at least 1000 m, more preferably at least 1900 m, even more preferably at least 2400 m, even more preferably at least 3000 m, in particular at least 4000 m; and/or a breaking length (wet) of at least 700 m, more preferably at least 900 m, even more preferably at least 1400 m, in particular at least 1900 m; and/or a relative wet strength of at least 10%, more preferably at least 20%, even more preferably at least 30%, in particular at least 40%.

All these values refer to the measuring methods explained in the section "Examples".

Cellulosic fibrous materials, such as pulp, normally do not exhibit any initial wet strength. This property may be achieved by selective oxidation of the cellulosic fibrous material due to the introduction of aldehyde groups without essential cleavage of the carbohydrate chain. Thus modified pulps exhibit an initial wet strength.

Particular suitability for oxidation is exhibited by polymers which, like cellulose, are composed of β-1-4 glycosidically bound anhydroglucose units or polymers which are predominantly composed of α-1-4 glycosidically bound anhydroglucose units. β-1-4 polyglycosides composed of anhydroglucose units are usually referred to as cellulose, whereas α-1-4 polyglycosides composed of anhydroglucose units are known as starch. These differ at least in terms of the properties of dissolving in aqueous solutions. Whereas cellulose is not usually soluble in water, starch can be dissolved in aqueous solutions, depending on the molecular weight.

A further aspect makes available a polysaccharide, particularly starch, whose primary (C6) and secondary (C2 and/or C3) hydroxyl groups are oxidized into aldehyde groups at least in part. Such oxidations can be achieved in different ways, particularly by means of "TEMPO oxidation" at position C6 and periodate oxidation ("periodate cleavage") at C2/C3.

It may be advantageous, particularly during the oxidation of starch, to oxidize just a specific part of the anhydroglucose units both at the primary and at the secondary alcoholic groups.

Figure 2:
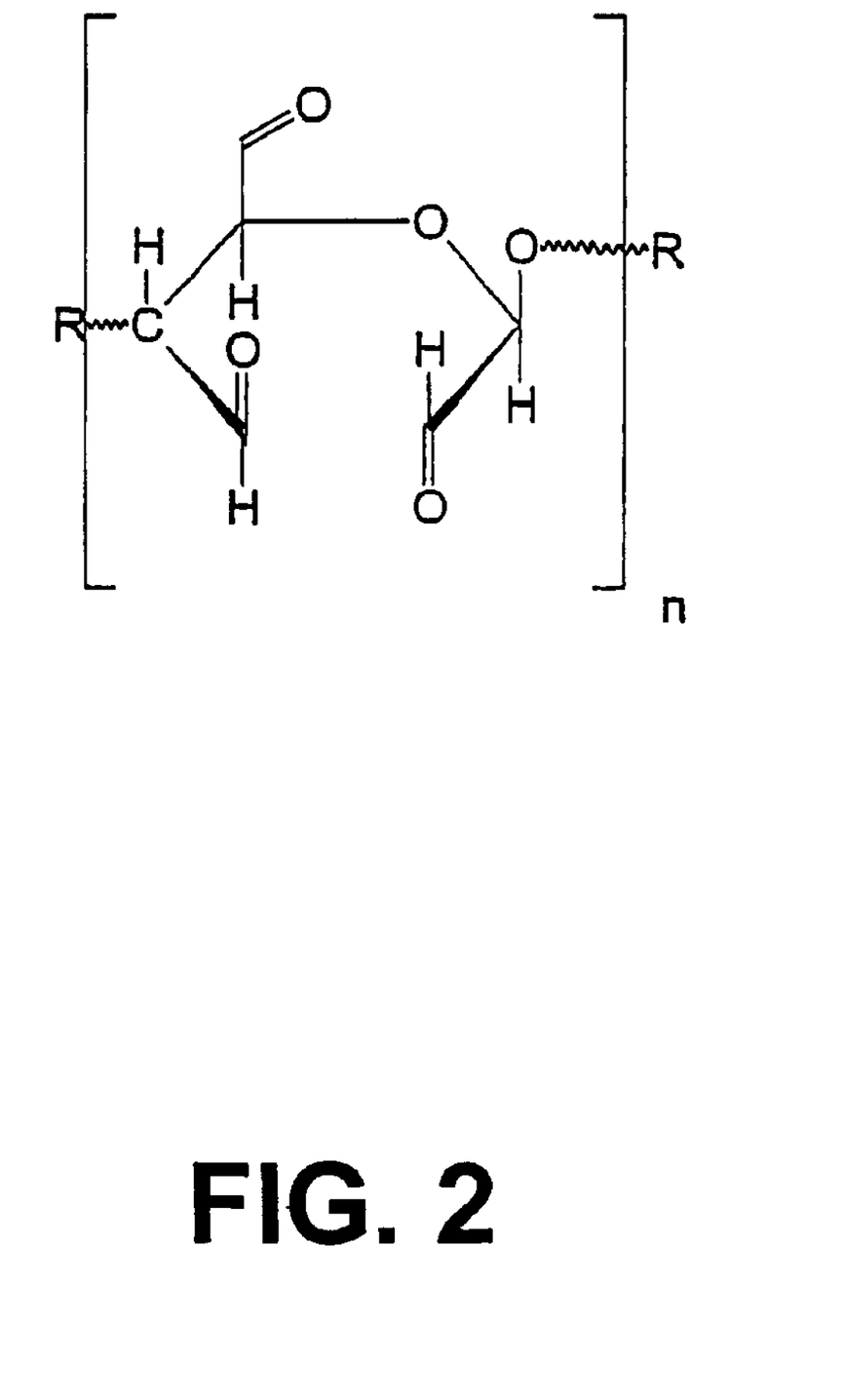
FIG. 2 is a trialdehyde according to the invention.
Figure 3:
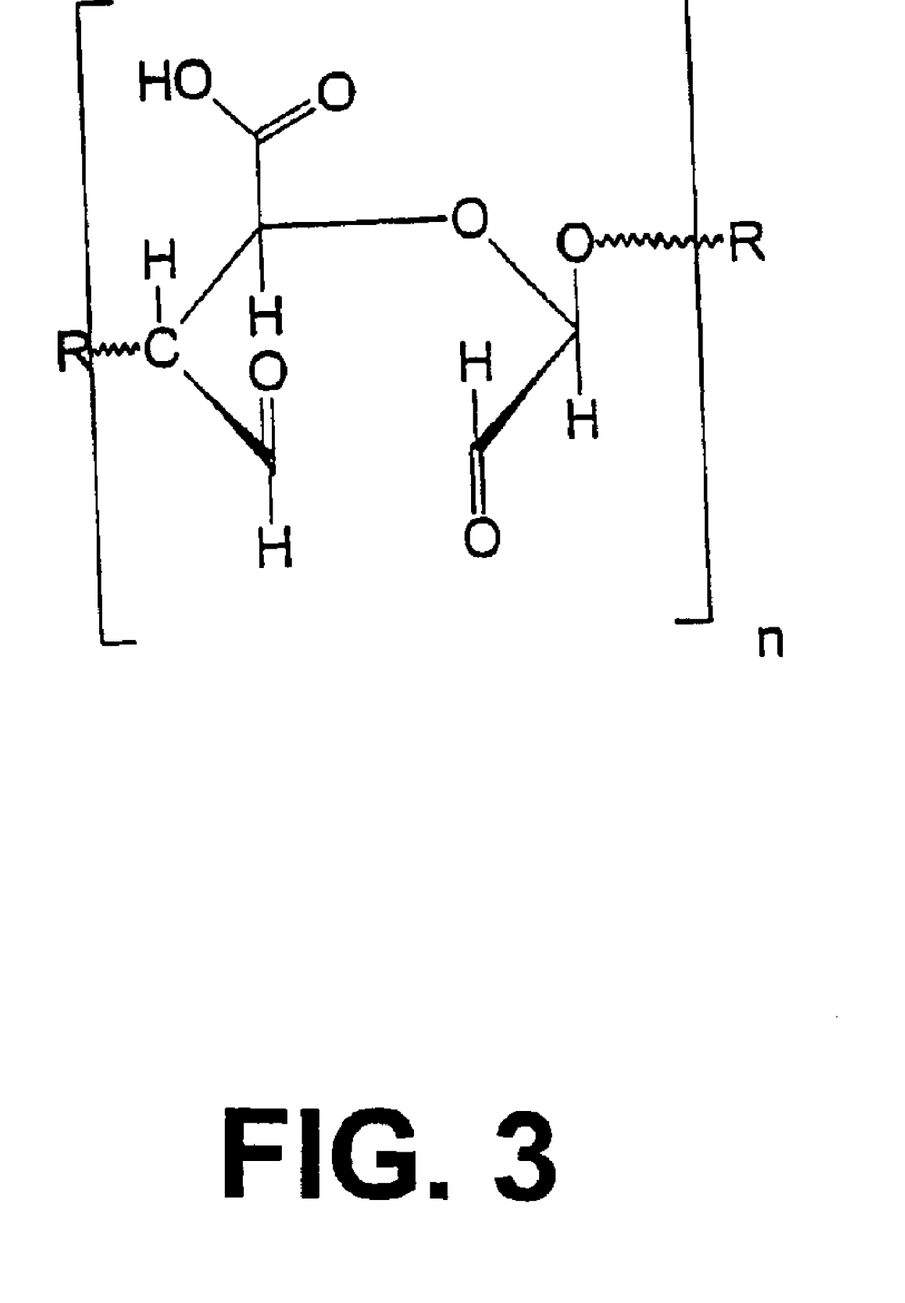
FIG. 3 illustratea the formation of a carboxyl group at the primary alcoholic group of a compound according to the invention.

As illustrated in FIG. 2, the invention may relate to a trialdehyde, but the invention also includes the oxidation of the hydroxymethyl group (C6 of the anhydroglucose unit) into a carboxyl group, as shown in FIG. 3. The invention also comprises the formation of a carboxyl group at the primary alcoholic group.

The formation of individual carboxyl groups at C2 or C3 may be advantageous in the case of starch, because a so-called β-elimination reaction that leads to a cleavage of the anhydroglucose unit occurs in an alkaline medium. This is accompanied by the decrease in the degree of polymerization and by easier solubility in aqueous solvents.

The starting pulps which may be used for oxidation may relate to primary fibrous materials (raw pulps) or to secondary fibrous materials, whereby a secondary fibrous material is defined as a fibrous raw material recovered from a recycling process. The primary fibrous materials may relate both to a chemically digested pulp and to mechanical pulp such as thermorefiner mechanical pulp (TMP), chemothermorefiner mechanical pulp (CTMP) or high temperature chemithermo-mechanical pulp (HTCTMP). Synthetic cellulose-containing fibers can also be used. Preference is nevertheless given to the use of pulp from plant material, particularly wood-forming plants. Fibers of softwood (usually originating from conifers), hardwood (usually originating from deciduous trees) or from cotton linters can be used for example. Fibers from esparto (alfa) grass, bagasse (cereal straw, rice straw, bamboo, hemp), kemp fibers, flax and other woody and cellulosic fiber sources can also be used as raw materials. The corresponding fiber source is chosen in accordance with the desired properties of the end product in a manner known in the art. For example, the fibers present in softwood which are shorter than those of hardwood lend the final product a higher stability on account of the higher diameter/length ratio. If the softness of the product is to be promoted, which is important e.g. for tissue paper, eucalyptus wood is particularly suitable as a fiber source.

With regard to the softness of the products, the use of chemical raw pulps is also preferred, whereby it is possible to use completely bleached, partially bleached and unbleached fibers. The chemical raw pulps suitable according to the invention include, inter alia, sulfite pulps, kraft pulps (sulfate process), soda pulps (cooking with sodium hydroxide), pulps from high-pressure cooking with organic solvents (e.g. Organosolv, Organocell, Acetosolv, Alcell) and pulps from modified processes (e.g. ASAM, Stora or Sivola process). Among the kraft pulps, it is possible to use those which were obtained in continuous cooking systems (MCC (modified continuous cooking), EMCC (extended modified continuous cooking) and ITC (isothermal cooking)). The products of discontinuous kraft processes (e.g. RDH (rapid displacement heating), Superbatch and Enerbatch) are also suitable as a starting product. The sulfite processes include the acidic sulfite/bisulfite processes, bisulfite process, "neutral sulfite semi-chemical pulping" (NSSC) process and alkaline sulfite processes such as processes in which in addition to aqueous alkali, sulfite and/or anthraquinone in combination with organic solvents such as methanol were used for cooking, e.g. the so-called ASAM process (alkali sulfite anthraquinone methanol). The major difference between the acidic and neutral or alkaline sulfite processes is the higher degree of delignification in acidic cooking processes (lower kappa numbers). The NSSC process provides semi-chemical chemical pulps which are advantageously defibered in downstream mechanical fibrillation before they are used according to the invention for the purpose of oxidation. The sulfite and kraft pulps considerably differ in terms of their fibrous material properties. The individual fiber strengths of sulfite pulps are usually much lower than those of kraft pulps. The mean pore width of the swollen fibers is also greater in sulfite pulps and the density of the cell wall is lower compared to sulfate pulps, which simultaneously means that the cell-wall volume is greater in sulfite pulps. For this reason, there are also obvious differences regarding water absorption and swelling behavior of the cellulosic fibrous materials, which must also be taken into consideration when selecting the raw material for oxidation.

Before a raw pulp is oxidized in the process according to the invention, it may also be advantageous to allow further delignification to occur in a separate process step.

In this way, for example, pulps which were cooked in alkaline pulp production techniques such as the kraft process or ASAM process were cooked in acidic pulp production techniques such as the acidic magnesium bisulfite process, and/or originate from processes in which organic solvents such as methanol (e.g. Organosolv, Organocell, Acetosolv, Alcell) were used should undergo a bleaching process to achieve a more extensive removal of lignin after the cooking process and to obtain a completely cooked pulp.

It is also preferred that before oxidation, the chemical pulp should undergo additional surface treatment (beating) which has a favorable effect on the strength properties of the obtained paper/tissue paper/nonwoven product.

Implementation of oxidation:

Oxidation is preferably performed so as to first oxidize primary hydroxyl groups (at C6) of the general type $H_2R$-OH into aldehyde groups. This can be selectively achieved by using a sterically hindered organic nitroxy compound. One, particularly two bulky groups in the α position to the NO is/are suitable for sterical hindrance of the NO group, e.g. optionally substituted phenyl or aliphatic substituents that are linked to the nitrogen atom of the NO by a quaternary C atom, e.g. tert-butyl. Two substituents can also be combined into an alkenyl unit optionally interrupted by a hetero-atom (e.g. O,N) (to form an alicyclic or heterocyclic ring).

Oxidation with nitroxy compounds usually leads, via the aldehyde function, to the carboxy function, the choice of oxidizing system and oxidation conditions making it possible to control the reaction such as to isolate the aldehyde stage. The proportion of carboxy groups usually rises as the reaction duration increases.

Preferred oxidation systems can be represented by the following formula IV (IV)

where n=0 or 1 and where the methylene groups of the ring may carry one or more substituents selected from alkyl, alkoxy, aryl, aryloxy, amino, amido (e.g. acetamido, 2-bromacetamido and 2-iodacetamido), oxo, cyano, hydroxy, carboxyl, phosphonooxy, maleimido, isothiocyanato, alkyloxy, fluorophosphinyloxy (particularly ethoxyfluorophosphinlyoxy), substituted or unsubstituted benzoyloxy, e.g. 4-nitrobenzoyloxy. If n=1 (i.e. the ring represents a piperidine), these groups preferably substitute the 4-position of the piperidine. The di-tert.-alkyl nitroxy unit can also be present as part of a polymer structure such as $\{(CH_3)_2-C-(CH_2)_{2-3}-(CH_3)_2-C-NO-\}_m$-. Hydroxy, amino and amido are preferred among these substituents on account of the stability of the nitroxy compound under acidic conditions.

An example of n=0 is PROXYL (2,2,5,5-tetramethylpyrrolidine- N-oxyl).

Among the formula IV compounds, the case of n=1 is preferred. This leads to the preferred optionally substituted TEMPO compounds (2,2,6,6-tetramethyl-4-piperidine-N-oxide) which can selectively oxidize the primary hydroxy group at C(6) of the anhydroglucose unit of the polysaccharide groups.

The nitroxy compound, e.g. optionally substituted TEMPO can be used
1) catalytically in combination with a primary oxidizing agent capable of returning the nitroxy compound to the oxidized state after its consumption (reduction), or
2) with the nitroxy compound as the only oxidizing agent (in the literature sometimes referred to as "stoichiometric reaction", although according to the invention it is not necessary to oxidize all hydroxy functions of the polysaccharide).

A list of suitable reaction conditions and compounds is found in A. E. J. De Nooy, Synthesis 1996, 1153–1174.

The pH range of this reaction generally is between 1 and 14, preferably 2 and 7, particularly 3 and 6, apart from exceptions mentioned below. The reaction temperature is preferably between 5° C and 80° C. The nitroxy compound may be added to a solution or suspension of the polysaccharide depending on its solubility in the aqueous reaction medium. It can be added as a solid (also as a pasty substance) or as a solution (usually as an aqueous solution). The preferred reaction time ranges from 15 minutes to several hours.

In the first case (nitroxy compound + primary oxidizing agent), preferably first the nitroxy compound and then the primary oxidizing agent is added. The oxidizing agent can be added all at once or distributed over the duration of the reaction (e.g. by evenly adding it in drops). The primary oxidizing agent is preferably selected from peracids, such as peracetic acid or perboric acid; ozone; hypohalite e.g. NaOCl or KOCl; hypochlorous acid; metal compounds that contain oxygen, such as a suitable oxidic compound of a metal of the transition metals of periods Va to VIIIa in the oxidation state of at least +3, e.g. oxides and oxygen-containing ions of manganese, chromium, iron, nickel, ruthenium and vanadium, e.g. vanadium pentoxide, iron oxide, chromium (VI) oxide, chromates and particularly manganese (IV) oxide and salts of permanganic acid; or oxidizing enzymes).

It is preferred to use chlorine-free oxidizing agents that contain oxygen, such as ozone or peracetic acid. Peracetic acid may be a so-called equilibrium peracetic acid meaning an equilibrium of hydrogen peroxide and peracetic acid; preference is given to the use of distilled peracetic acid that contains only minute quantities of free hydrogen peroxide. In the case of oxidation using peracetic acid, it is also beneficial to add water-soluble bromide such as sodium bromide or bromoacetic acid. There is no intention, however, to exclude the implementation of oxidation without the use of bromine.

The primary oxidizing agent is preferably used in an amount of 0.1 to 20 wt. %, particularly 0.5 to 7.5 wt. %, in relation to the dry weight (oven-dried) of the polysaccharide. The catalytic quantity of the nitroxy compound is preferably 0.05 to 15 wt. % relative to the dry weight (oven-dried) of the polysaccharide.

If the nitroxy compound is the only oxidant (above case 2), this compound is preferably used in amounts of up to 150 wt % with respect to the dry weight of the polysaccharide, e.g. pulp.

Further preferred embodiments to perform the oxidation of a polysaccharide, e.g. pulp at position C(6) of the anhydroglucose units of the polysaccharide to the corresponding aldehyde are explained in the following.

One preferred version lies in the oxidation of the polysaccharide, e.g. pulp with a catalytic amount of the formula I nitroxy compound that is hydroxy-, amino- or amido-substituted (e.g. 4-hydroxy TEMPO) at a pH of less than 9, more preferably between 1 and 7, particularly 2 to 6. In this version, a hypohalite (e.g. NaOCl) or ozone is particularly suitable as a primary oxidizing agent. The nitroxy compound is preferably used here in an amount of 0.05 to 15 wt. % and the primary oxidizing agent in an amount of 0.1 to 20 wt. %, each relative to the dry weight of the polysaccharide. The reaction temperature is preferably 5 to 50° C. Depending on the reaction duration, this embodiment of oxidation results in the desired formation of aldehydes at C(6) of anhydroglucose units of the polysaccharide. Halogen-free acids, such as sulfuric acid or toluene sulfonic acid, are particularly suitable for setting the pH.

The preferred (sole) formation of aldehyde groups can be influenced by the pH at which oxidation is performed and by the use of 4-OH TEMPO. In general, oxidation of cellulosic fibrous materials such as pulp is performed in an aqueous suspension, i.e. in a heterogeneous phase. A pH of <9, preferably of 7–1, is set. In this way, aldehyde groups are formed particularly in the acidic pH range when 4-OH TEMPO is used, without any carboxyl groups being formed to a substantial extent.

Further TEMPO and in particular amido-substituted nitroxy compounds (e.g. 4-acetamido TEMPO) of the aforementioned formula I are suitable for stoichiometric oxidation at a pH between 1 and 7, particularly 2 to 6, particularly <3, e.g. 2 to <3. Such low pH shifts the equilibrium between disproportionation and synproportionation further toward disproportionation. Thus it is particularly beneficial to perform the reaction in a pH range <pH 3. In this reaction, HCl or halogen-free acids such as sulfuric acid or toluene sulfonic acid are particularly suitable for adjusting the pH. Under these conditions, the nitroxy compound present as a radical disproportionates into an oxammonium ion that acts as an oxidizing species and a hydroxylamine. After the reaction, the consumed (reduced) form of the nitroxy compound can be regenerated with ozone or another oxidizing agent, preferably in a separate process step. An important advantage of the oxidation version discussed here is the ability to use the choice of a suitable pulp (TCF, see following sections) to conduct the entire paper/tissue-paper/nonwoven production method without any halogen-containing chemicals.

Particular suitability for oxidation is exhibited by 4-hydroxy TEMPO. The amount of 4-hydroxy TEMPO used varies between 150–0.05% relative to the polysaccharide (dry weight). The 4-hydroxy TEMPO should be added in a molar ratio of 2:1, if no further oxidizing agent is added in order to achieve complete oxidation of the primary alcoholic group. 4-acetamido. TEMPO can also be used, however, in equal molar amounts without any further oxidizing agent in order to oxidize the primary alcoholic group.

The oxidation reaction is performed such as to adjust the aqueous suspension of cellulose first to a consistency of 20–0.1%, preferably 10–0.1%. The acidic pH range is adjusted by addition of hydrochloric acid (HCl), sulfuric acid ($H_2SO_4$), toluene sulfonic acid, phosphoric acid ($H_3PO_4$), nitric acid ($HNO_3$) or acetic acid ($CH_3COOH$). In the case of chlorine-free production processes, the use of hydrochloric acid is preferably dispensed with. The N oxide can then be added. It is irrelevant here whether the N oxide is previously dissolved and then incorporated into the aqueous suspension or whether it is added as a solid. Due to the ready solubility of 4-hydroxy-2,2,6,6,-tetramethyl piperidine oxide in water, complete dissolution may be present, even if it is used in excess of a stoichiometric amount.

After the reaction of the polysaccharide, for instance a cellulosic fibrous material, such as pulp, this material is preferably washed or otherwise purified so that there is a quantitative removal of the chemicals used.

This is preferably followed by oxidation of the secondary alcoholic groups, a periodate, in particular sodium periodate preferably being used as an oxidizing agent. Alternatively lead tetraacetate as well as NaOCl, NaOBr, and their corresponding acids could be used.

There is no intention, however, to exclude the fact that the pulp or another polysaccharide is first oxidized with periodate and then the TEMPO oxidation is performed.

Depending on the number of secondary alcoholic groups converted at the polymer into aldehyde groups, the use of varyingly large amounts of periodate, preferably sodium periodate is necessary. Preferably an amount of 1 to 25 wt. %, based on the dry weight of the polysaccharide, in particular cellulosic fibrous material, is used.

If all the secondary alcoholic groups are to be completely oxidized, a stoichiometric ratio of periodate to secondary OH groups of 1:1 is needed.

The reaction is conducted at a pH of <7, the use of a pH range of 2 to 6, more preferably 3 to 5.5, in particular 4 to 5 being advantageous. After adjustment of the pH, periodate is dissolved in the aqueous medium, containing the polysaccharide, e.g. the cellulosic fibrous material suspended in an aqueous medium, and is reacted with the polysaccharide by stirring. The reaction time may vary between a few minutes and several days. Preferably, it ranges from 10 minutes to 1 day. A temperature of between 1 and 50° C can be chosen for the reaction; oxidation can usually occur at room temperature.

Upon reaction the oxidized polysaccharide is purified. Water can be used to wash the chemicals out of the cellulosic fibrous material.

Further, it may be preferred to recover the periodate after use since it is an expensive chemical. This can be achieved electrochemically or chemically, e.g. with NaOCl.

A polysaccharide oxidized both at the primary and at the secondary alcoholic groups enjoys advantages over the non-oxidized product.

In the case of the oxidation of pulps, the introduction of aldehyde groups at positions C2 and/or C3 as well as C6, in particular C2, C3 and C6 of the anhydroglucose units results in a higher initial wet strength, partially also dry strength than can alone be achieved by just oxidizing position C6 (TEMPO oxidation) or alternatively the two OH groups at C2 and C3 (periodate oxidation).

Best mode:

Based on the present knowledge, the best mode for practicing the invention involves 1. first, oxidizing a cellulosic fibrous material, such as pulp in an aqueous system, by means of 4-Hydroxy-TEMPO or 4-Acetamido-TEMPO in an amount of 0.5 to 10 wt. %, based on the dry weight of the fibrous material, in the presence of NaOCl in an amount of 0.1 to 5 wt. %, based on the dry weight of the fibrous material at a pH of 2 to 10 and a temperature of 5 to 60° C over a time period of 0.25 to 3 h, in order to generate aldehyde functions at position C(6) of the cellulosic chains within the material;

2. then, filtering off and washing the oxidized cellulosic fibrous material, 3. then, further oxidizing the cellulosic fibrous material using sodium periodate in an amount of 1 to 25 wt. %, based on the dry weight of the fibrous material at a pH of 2 to 6 and a temperature of 10 to 60° C over a time period of 15 min to 1 day, in order to generate aldehyde functions at position C(2) and (3) of the cellulosic chains within the fibrous material.

PAPER OR NONWOVEN (PRODUCTS) MADE FROM OXIDIZED POLYSACCHARIDE

The present invention also relates to paper or nonwoven (products) comprising the oxidized polysaccharide, in particular cellulosic fibrous material according to the invention, preferably in the amount of at least 50wt.-%, especially at least 80 -wt. cellulosic fibrous material, relative to the finished paper or nonwoven (product) (dry weight).

Preferably, the paper is a tissue paper.

The tissue paper or nonwoven may be one-ply or multiple-ply.

The German terms "Vlies" and "Vliesstoffe" (English: nonwoven) are applied to a wide range of products which in terms of their properties are located between the groups, paper, cardboard, and board on the one hand and the textile products on the other, and are currently summarized under the term "nonwovens" (see ISO 9092 –EN 29092). The invention allows the application of a large number of extremely varied processes for producing nonwovens, such as what are called air-laid and spun-laid techniques, as well as wet-laid techniques.

Nonwovens may also be called textile-like composite materials, which represent flexible porous fabrics that are not produced by the classic methods of weaving warp and weft or by looping, but by intertwining and/or by cohesive and/or adhesive bonding of typical synthetic textile fibers which may for example be present in the form of endless threads or threads prefabricated of an endless length, as synthetic threads produced in situ or in the form of staple fibers. The nonwovens according to the invention can thus consist of mixtures of synthetic fibers in the form of stable fibers and the fibrous material according to the invention.

"Papers" are also planar materials, albeit essentially composed of fibers of a vegetable origin and formed by drainage of a fibrous-material suspension on a screen or between two continuously revolving screens and by subsequent compression and drainage or drying of the thus produced fibrous mat (cf. DIN 6730, May 1996). The standard restricts the range of mass per unit area (basis weight) for paper to a maximum of 225 g/m².

Depending on the type of paper, the production process also comprises a gluing and/or smoothing step, along with the typical process steps of sheet formation, pressing, and drying described above.

Based on the underlying compatibility of the production processes (wet laying), "tissue" production is counted among the paper making techniques. The production of tissue, or more accurately, raw tissue—meaning the one-ply (intermediate) product manufactured on a special-purpose tissue machine or tissue paper making machine—is distinguished from paper production by its extremely low basis weight of normally not more than 65, in particular not more than 40 g/m² and its much higher tensile energy absorption index (In processing inventive pulp to tissue paper or tissue paper products (single-ply or multi-ply), one generally selects a basis weight of 8 to 65 g/m$^2$, especially 10 to 40 g/m$^2$.) The tensile energy absorption index is arrived at from the tensile energy absorption in which the tensile energy absorption is related to the test sample volume before inspection (length, width, thickness of sample between the clamps before tensile load). Paper and tissue paper also differ in general with regard to the modulus of elasticity that characterizes the stress-strain properties of these planar products as a material parameter.

A tissue's high tensile energy absorption index results from the outer or inner creping. The former can be produced by compression of the paper web adhering to a dry cylinder as a result of the action of a crepe doctor or in the latter instance as a result of a difference in speed between two screens ("fabrics"). This causes the still moist, plastically deformable paper web to be internally broken up by compression and shearing, thereby rendering it more stretchable under load than an uncreped paper. Most of the functional properties typical of tissue and tissue products result from the high tensile energy absorption (see DIN EN 12625-4 and DIN EN 12625-5).

An example of papers and paper products is represented by hygiene papers, particularly tissue papers and hygiene products (tissue products) made therefrom and which are e.g. used in personal grooming and hygiene, the household sector, industry, the institutional field in a wide variety of cleaning processes. They are used to absorb fluids, for decorative purposes, for packaging or even as supporting material, as is common for example in medical practices or in hospitals.

Hygiene paper primarily includes all kinds of dry-creped tissue paper, as well as wet-creped paper and cellulose or pulp wadding.

The one-ply intermediate products originating from the paper-making machine and made of lightweight paper usually dry-creped on a yankee cylinder by means of a crepe doctor are generally described as "tissue paper" or more accurately raw tissue paper. The one-ply raw tissue may be built up of one or a plurality of layers respectively.

All one-ply or multi-ply final products made of raw tissue and tailored to the end user's needs, i.e. fabricated with a wide variety of requirements in mind, are known as "tissue products".

Typical properties of tissue paper include the ready ability to absorb tensile stress energy, their drapability, good textile-like flexibility, properties which are frequently referred to as crumple softness, a high surface softness, a high specific volume with a perceptible thickness, as high a liquid absorbency as possible and, depending on the application, a suitable wet and dry strength as well as an interesting visual appearance of the outer product surface.

These properties allow tissue paper products to be used for example as cleaning cloths, sanitary products (e.g. toilet paper), paper handkerchiefs, cosmetic wipes (facials) or as serviettes/napkins.

Paper can be formed by placing the fibers, in an oriented or random manner, on one or between two continuously revolving screens of a paper making machine while simultaneously removing the main quantity of water of dilution until dry-solids contents of usually between 12 and 35% are obtained.

If tissue paper is to be made out of the cellulosic fibrous material according to the invention, the process essentially comprises a forming that includes the headbox and the screen portion,
b the drying portion (TAD (through air drying) or conventional drying on the yankee cylinder) that also usually includes the crepe process essential for tissues,
c the monitoring and winding area.

Drying the formed primary fibrous web occurs in one or more steps by mechanical and thermal means until a final dry-solids content of usually about 93 to 97%. In the case of tissue making, this stage is followed by the crepe process which crucially influences the properties of the finished tissue product in conventional processes. The dry crepe process that is predominantly in use today involves creping on a usually 4.5 to 6 m diameter drying cylinder, the so-called yankee cylinder, by means of a crepe doctor in the case of the aforementioned final dry-solids content of the raw tissue paper (wet creping can be used if lower demands are made of the tissue quality). In the next step, the creped, finally dry raw tissue paper (raw tissue) is then usually wound on to a supporting core to form a so-called reel drum or is wound in a longitudinally cut manner on cores to form master rolls and is available in this form for further processing into the paper product or tissue paper product according to the invention.

Instead of the conventional tissue making process described above, the invention gives preference to the use of a modified technique in which an improvement in specific volume is achieved by a special kind of drying within process section b and in this way an improvement in the bulk softness of the thus made tissue paper is achieved. This known process, which exists in a variety of subtypes, is termed the TAD (through air drying) technique. It is characterized by the fact that the "primary" fibrous web that leaves the sheet making stage is pre-dried (like a nonwoven) to a dry-solids content of about 80% before final contact drying on the Yankee cylinder by blowing hot air through the nonwoven fabric. The nonwoven fabric is supported by an air-permeable screen or belt and during its transport is guided over the surface of an air-permeable rotating cylinder drum. Structuring the supporting screen or belt makes it possible to produce any pattern of compressed zones broken up by deformation in the moist state, resulting in increased mean specific volumes and consequently leading to an increase in bulk softness without decisively decreasing the strength of the fiber web fabric. Another possible influence on the softness and strength of the raw tissue lies in the production of a layering in which the primary nonwoven fabric to be formed is built up by a specially constructed headbox in the form of physically different layers of fibrous material, these layers being jointly supplied as a pulp strand to the sheet making stage. The surface softness can be significantly increased by suitably selecting the raw materials in the headbox outlet nozzle channels that determine the layering, for example by using eucalyptus fibers and/or wattle, at the nonwoven side facing toward the yankee cylinder surface, which benefits the products manufactured from raw tissue production.

When processing the raw nonwoven or raw paper into the final product (third process section), the following procedural steps are normally used individually or in combination: cutting to size (longitudinally and/or cross cutting), producing a plurality of plies, producing mechanical ply adhesion, volumetric and structural embossing, ply adhesion, folding, imprinting, perforating, application of lotions, smoothing, stacking, rolling up.

To produce multi-ply tissue papers, such as handkerchiefs, toilet paper, towels or kitchen towels, an intermediate step preferably occurs with so-called doubling in which the raw tissue is usually unwound in a reel drum number corresponding to the finished product's desired number of plies and is wound on a common multiply master roll. This processing step frequently includes smoothing or calendering in two-roll or multi-roll calenders. After completion of drying and creping, smoothing (calendering) may also, however, be performed in the tissue machine directly before reeling up.

The processing step from the raw tissue that has already been optionally wound up in several plies to the finished tissue product occurs in special purpose-built processing machines which include operations such as repeated smoothing of the tissue, edge embossing, to an extent combined with planar and/or local gluing to produce ply adhesion of the individual plies (raw tissue) to be combined together, as well as longitudinal cut, folding, cross cut, placement and bringing together a plurality of individual tissues and their packaging as well as bringing them together to form larger surrounding packaging or bundles. Instead of edge embossing, the production of ply adhesion can also be achieved by edging, as is common e.g. in the case of cosmetic tissues.

The individual paper ply webs can also be pre-embossed and then combined in a roll gap according to the foot-to-foot or nested methods.

EXAMPLES

Test Methods

The following test methods were used to evaluate the oxidized polysaccharide, in particular fibrous materials according to the invention as compared to materials which correspond, but which have not been modified by oxidation.

1) Producing Test Sheets

Test sheets (having a basis weight of approx. 70–85 g/m$^2$) were made in accordance with the SCAN M 5:76 method (revised November 1975) in a standard laboratory sheet former with a pulp concentration of 2 g/l. All sheets were kept for one day in a standard atmosphere (23° C. and 50% relative humidity). After that, the sheets were cured in the oven at 105° C. for 10 minutes in order to simulate the heating in a papermaking process and then again kept for one day in the aforementioned standard atmosphere, before they were tested.

2) Initial Wet Strength (Width-Related Breaking Strength(Wet)) and Tear Length (Wet)

The wet strength was measured according to DIN ISO 3781, [Paper and Cardboard, tensile test; determination of the width-related breaking strength after immersion in water; October 1994 (identical to ISO 3781 : 1983)], is defined as initial wet strength of the fibrous material networks according to the invention.

When experimentally checking the invention, the tensile test was accordingly performed by means of an electronic tensile test apparatus (Model 1122, Instron Corp., Canton, Mass., USA) with a constant rate of elongation of 10 mm/min using a Finch device. The width of the test strips was 15 mm. The strip length was about 180 mm. The free clamping length when using the Finch clamp was about 80 mm. The test strip was secured with both ends in a clamp of the test apparatus. The other end (loop) formed in this way was placed around a pin and treated at 20° C with distilled water until complete saturation. The soaking period of the samples before tensile testing was fixed at 30 s. Six test strips at a time were measured, the result being indicated as an arithmetic mean.

To ensure that the wet strength of the samples has fully developed, which is particularly necessary in the case of samples in which additional wet-strength agents were used to boost wet strength, e.g. by their addition in the mass, the samples to be tested were always artificially aged before conducting the tensile test. Aging was effected by heating the samples in an oven to 105° C. for a period of 10 min.

Six test strips at a time were measured, the result being indicated as an arithmetic mean.

The tear length (wet) was calculated from the width-related breaking strength in accordance with the following formula (see TAPPI 494-96-, Comment 9):

RL=102000 (T/R)

where T is the initial wet strength in kN/m and R is the basis weight in g/m$^2$(in a standard climate)

3) Dry Strength (Width-Related Breaking Strength (Dry)) andTear Length (Dry)

The dry strength was determined according to DIN EN ISO 1924-2, Paper and Cardboard, determination of properties under tensile load. Part 2: Method at a constant rate of elongation, April 1995, (ISO 1924-2 : 1994).

The tear length (dry) was calculated from the width-related breaking strength in accordance with the following formula (see TAPPI 494-96, Comment 9):

RL=102000 (T/R)

where T is the tensile strength in kN/m and R is the basis weight in g/m$^2$(in a normal climate)

4) Relative Wet Strength

The relative wet strength (WS) was calculated as follows:

rel. WS =BSwet/BSdry where $BS_{wet}$ is the width-related breaking strength of the wet sample strip and $BS_{dry}$ is the width-related breaking strength of the dry sample strip, and these values were ascertained in the manner described above.

5) Determination of the Aldehyde and Carboxyl content

For the determination of the aldehyde contents, and in addition the carboxyl content, in the polysaccharide of the invention, one of the following methods can be suitably adopted by a skilled person.

When dealing with soluble polysaccharide known NMR methods, if suitable in combination with other analytical techniques such as IR or mass spectrometry, can be adopted for determining the content of aldehyde groups and carboxy at positions C2 and/or C3 as well as C6.

In the case of water-insoluble polysaccharides such as pulp the methods 5.1. (conductometric) and 5.4. (hydroxylamine) can be applied which measure the total content of aldehyde and/or carboxy groups. The remaining methods 5.2. (uronic acid determination) and 5.3. (NMR) allow a specific distinction of C(6)-aldehyde and/or carboxy groups, even if other aldehyde and/or carboxy groups are present within the polysaccharide chain. Method 5.5. allows the determination of surface aldehyde and carboxy contents.

5.1.) The content of carboxyl groups in the fibers' cellulose chain can be detected by a conductometric titration and is calculated by converting the thus obtained charge value (into μmol aldehyde/g).

The aldehyde content is obtained by performing a first conductometric titration with the oxidized cellulose to determine the carboxyl group content, selectively oxidizing the aldehyde groups into carboxyl groups as described below performing a second conductometric titration to detect the content of additionally formed carboxyl groups and deducting the charge values obtained in the first and second conductometric titrations from one another and converting them into µmol aldehyde/g.

The weight data (g) refer to the fibrous material dried for 6 h at 105° C. (oven-dried).

The conductometric titration was performed by titration with sodium hydroxide after lowering the pH of the fiber suspension (pulp density <1%) using HCl (pulp density <1%) to about 3. At pH 3, an ion exchange is produced at the carboxylate functions so that the H- form is obtained. An optimum NaCl concentration ($0.2 \times 10^{-3}$ M) is used to suppress the Donnan equilibrium, i.e. to suppress the difference in pH between the fiber and the pH of the surrounding solution. During the titration, nitrogen gas is passed through the suspension to remove $O_2$ and $CO_2$ that disturb the titration. Both the changes in pH and the changes in conductivity are recorded during the titration. The length of the conductivity plateau is taken as a gauge for the amount of weak acids in the sample, and this plateau is calculated from the volume of sodium hydroxide solution in use and its concentration. The measuring method is performed at a temperature of 20° C.

A suitable method of performing the conductometric titration and determination of the COOH content is also described by S. Katz in "Svensk Papperstidning" 6/1984, p. 48. S. Katz also describes the distinction between sulfonic acid groups and COOH groups in sulfite pulp.

The oxidation of the aldehyde groups into COOH groups was performed as follows. The pulp (1–2g) was suspended in deionized water (100 ml) and the pH adjusted to 5 using HCl/NaOH. Before oxidation, a stoichiometric amount of $H_2O_2$ (relative to the estimated* amount of aldehyde functions, see below) is added in order to suppress any formation of chlorine during the reaction. One mol of aldehyde groups requires the addition of 1 mol $NaClO_2$, so that the aldehyde content should be estimated* at this time. The $NaClO_2$ consumption can nevertheless be monitored and an excess (approx. 10%) used. For those skilled in the art the reaction can be followed by the pH drop. The $NaClO_2$ is added in small portions while stirring the suspension, keeping the pH at 5 (temperature 20–25° C.). After the addition of $NaClO_2$, sodium hydroxide is optionally used to re-adjust the pH to pH 5 and the suspension is left to agitate over night. After drainage, the pulp can be used, as described above, for the conductometric measurement of the COOH content.

If the estimate was wrong, a correction may become necessary. If the aldehyde content was estimated too high and therefore an excess of hydrogen peroxide was added, no correction is necessary. However, if the amount of aldehyde is estimated too low (recognizable by the fact that the reaction continues) an extra amount of hydrogen peroxide should be added followed by the corresponding amount of sodium chlorite. The continuation of the reaction is to be checked via a pH decrease. As long as the pH drops, more hydrogen peroxide and sodium chlorite is to be added. The necessary amounts of hydrogen peroxide and sodium chlorite correspond to one another at a 1:1 molar ratio.

5.2.) Another more selective method for determining the content of C(6)-aldehyde/carboxy groups in the fibrous material of the invention is the Blumenkrantz method (N. Blumenkrantz and G. Asboe-Hansen, Anal. Biochem. 1973, 54, 484). This method is based on the colorimetric determination of a pink compound arising when a decomposition product of the uronic acid polymer (C6-carboxy cellulose) reacts with 3-hydroxybiphenyl.

To a sample containing 1–20 µg oxidized fibrous material (dissolved in 0,2 ml water) 1.2 ml of a solution of 0,0125 M boric acid (e.g. obtainable from E. Merck, Germany) in conc. sulfuric acid (95–97%; e.g. obtainable from E. Merck, Germany) is added. The sample is heated in boiling water for 5 minutes, followed by cooling in ice (to room temperature or below). Then 20 µl of an aqueous solution of 0,2% 3-hydroxybiphenyl e.g. obtainable from Aldrich) is added. After 15 minutes incubation the extinction is measured ($\lambda$=520 µm). D-glucuronic acid or its lactone (both e.g. obtainable from Aldrich) is used as reference material.

If the sample to be analysed turns out to be poorly soluble in water (generally at a low degree of oxidation), the above method is modified by dissolving the sample in 90% sulfuric acid/boric acid mixture obtained by adding 10 vol. % water to 90 vol. % of a solution of 750 mg boric acid in 11 conc. sulfuric acid (E. Merck, as above). From this sulfuric acid/boric acid solution of the fibrous material 0.2 ml are taken and added to 0.2 ml water. To this mixture 1.0 ml of a solution of 0.0125 M boric acid in conc. sulfuric acid (E. Merck, as above) is added. Then the procedure is continued as above. ). Also in this case D-glucuronic acid or its lactone (both e.g. obtainable from Aldrich) is used as reference material.

The aldehyde content can be determined, by

Determining the content of uronic acid groups before and after the oxidation of C(6)-aldehyde groups to C(6)-carboxy groups (uronic acids) with chlorite and hydrogen peroxide, and Subtracting these values.

5.3.) An alternative for the determination of C(6)-aldehyde contents involves the conversion of the oxidized material with hydroxylamine hydrochloride to the oxim. The C(6)oxim displays a distinct signal in $^{13}C$ NMR spectra.

5.4.) A further option for determining the aldehyde content involves the hydroxylamine method: to a sample of 25 ml water containing lg of aldehyde-containing fibers, 0.20 g hydroxylammonium chloride (e.g. obtainable from E.Merck, Germany) was added which results in a gradual decrease of the pH value. The reaction mixture is heated for at least 3 hours at 40° C. The amount of HCl released was then titrated with 0.1 M NaOH (Titrisol, obtainable from Merck, Germany) up to end point of pH 3,4 and the consumed NaOH recalculated to µmol aldehyde/g fibers.

5.5. The content of surface aldehyde and carboxy groups is determined as follows: The content of surface aldehyde and carboxy groups is determined by polyelectrolyte titration (Wagberg, L., Ödberg, L., Glad-Nordmark, G.: Nord. Pulp. Pap. Res. J. 2, p. 71–76 (1989)).

The content of carboxy groups on the fiber surface generated by this oxidation can be detected by a polyelectrolyte titration, subtracting the charge value of the reference pulp and converting the charge value thus obtained (into µmol carboxy/g).

The surface aldehyde content is obtained by:

Performing a polyelectrolyte titration of the oxidized cellulose-containing fibrous material to determine the carboxyl group content on the fiber surface, Selectively oxidizing the aldehydes into carboxyl groups as described above under item 5.1., Performing a second electrolytic titration to detect the content of additionally formed carboxyl groups on the fiber surface, and Subtracting the charge values obtained in the first and second electrolytic titration from one another and converting the thus obtained charge value (into µmol aldehyde/g).

Experimental Conditions:

Pulp used in the experiment was a completely chlorine free bleached kraft pulp (BSWK; Grapho Celeste, SCA, Östrand, Sweden, kappa number 2.3, whiteness 89% ISO). Prior to any treatment the pulp was disintegrated in portions of 30 g diluted in 2 liter of water according to SCAN std method C18:65 (1964). Both sodium periodate and TEMPO oxidation steps were performed at a pulp concentration of 1.5% and at room temperature (20° C.).

After the first treatment, which can be a sodium periodate treatment, NaOCl treatment, or a treatment with 4-OH TEMPO or 4-Acetamido-TEMPO, as explained below, the pulp was filtered off on a Buchner funnel and washed three times with deionised water. The pulp was stored cold at +7° C. before further use.

Prior to the second treatment, as explained below, the pulp was disintegrated according to SCAN std method C18:65 (1964). After this second treatment, either a sodium periodate or TEMPO oxidation (4-OH- or 4-Acetamido-TEMPO), the pulp was filtered off on a Büchner funnel and washed three times with deionised water.

Sodium Periodate Oxidation:

The pulp suspension was adjusted with HCl or NaOH to a pH of 4 to 5. Sodium periodate was added as an aqueous solution (0.24 M) to the suspension during constant stirring. The amount of sodium periodate, based on the pulp employed (dry weight), was 25, 5, or 1 weight %, respectively. The reaction times were 25, 20, or 5 hrs. The reaction was performed in the dark in order to avoid unwanted side-reactions. The reaction was stopped by washing the pulp.

4-Acetamido-TEMPO Oxidation:

The pulp suspension was adjusted with HCl and NaOH to a pH of 8 to 8.3. Then, 4-Acetamido-TEMPO was added as an aqueous solution (concentration 10 mg/ml) in an amount of 1 wt % (of. table 1), based on the dry weight of the pulp. Subsequently, NaOCl was added in a total amount of 1, 3, or 5 wt. % (as described in table 1), based on the dry weight of the pulp. After a reaction time of 0.5 hrs under constant stirring the reaction is stopped by washing the pulp.

4-OH-TEMPO Oxidation:

The pulp suspension was adjusted with HCl and NaOH to pH 4.5. NaOCl was then added while maintaining a constant pH level. 4-OH-TEMPO is added as a solid to the pulp suspension in an amount of 4 wt. % (cf. table 1), based on the dry weight of the pulp. Gradually, during the first 40 minutes, NaOCl was added in a total amount of 5 wt. % (experiment Nr. E of table 1), based on the dry weight of the pulp. After a reaction time of 1 hr under constant stirring, the reaction was stopped by washing the pulp. In experiment No. C of table 1, NaOCl was not added and the reaction was stopped by washing after one hour.

Reference Pulp 0:

This pulp (totally chlorine-free bleached kraft pulp (BSWK; Grapho Celeste, SCA, Östrand, Sweden, kappa number 2.3, whiteness 89% ISO)) was not treated with oxidizing agents at all. It was only subjected to the pH adjustment of the above treatment steps (1st, to pH 8–8,5 with NaoH and HCl; 2nd, to pH 5 with NaOH and HCl).

Experiment A (comparative):

Treatment 1: Sodium periodate (25 weight %, based on dry weight of the pulp fibers) is added and reacted for 5 hrs at a pH of 4–5.

Treatment 2: No addition of oxidizing agent, only pH adjustment to 8–8.3.

Experiment B (Comparative):

Treatment 1: Sodium periodate (25 weight %, based on dry weight of the pulp fibers) is added and reacted for 25 hrs at pH 4–5.

Treatment 2: No addition of oxidizing agent, only pH adjustment to 8–8.3.

Experiment C (comparative):

Treatment 1: No addition of oxidizing agent, only pH adjustment to 4–5.

Treatment 2: pH adjustment to 8–8.3 and oxidation with 4-OH-TEMPO (no addition of primary oxidizing agent).

Experiment D (comparative):

Treatment 1: No addition of oxidizing agent, only pH adjustment to 4–5.

Treatment 2: pH adjustment to 8–8.3 and oxidation with 4-Acetamido-TEMPO (no addition of a primary oxidizing agent).

Experiment E (invention):

Treatment 1: 4-OH-TEMPO/NaOCl oxidation at pH 4.5.

Treatment 2: Sodium periodate (25 weight %, based on dry weight of the pulp fibers) is added and reacted for 20 hrs at pH 4–5.

Experiment F (invention):

Treatment 1: 4-Acetamido-TEMPO/NaOCl oxidation at pH 8–8.3.

Treatment 2: Sodium periodate (25 weight %, based on dry weight of the pulp fibers) is added and reacted for 20 hrs at pH 4–5.

Experiment G (invention):

Treatment 1: 4-Acetamido-TEMPO/NaOCl oxidation at pH 8–8.3.

Treatment 2: Sodium periodate (5 weight %, based on the dry weight of the pulp fibers) is added and reacted for 25 hrs at pH 4–5.

Experiment H (invention):

Treatment 1: 4-Acetamido-TEMPO/NaOCl oxidation at pH 8–8.3.

Treatment 2: Sodium periodate (1 weight %, based on dry weight of pulp fibers) is added and reacted for 25 hrs at pH 4–5.

Experiment I (invention):

Treatment 1: 4-Acetamido-TEMPO oxidation at pH 8–8,3 adding a lesser amount (3 weight %) of primary oxidant NaOCl.

Treatment 2: Sodium periodate (1 weight %, based on dry weight of pulp fibers) is added and reacted for 25 hrs at pH 4–5.

Experiment J (invention):

Treatment 1: 4-Acetamido-TEMPO oxidation at pH 8–8.3 adding a lesser amount (1 weight %) of primary oxidant NaOCl.

Treatment 2: Sodium periodate (1 weight %, based on dry weight of pulp fibers) is added and reacted for 25 hrs at pH 4–5.

The experimental conditions of experiments A–J are summarized in table 1.

From the reference pulp O and the oxidized pulps obtained in experiments A–J test sheets were formed as described in the section "Test Methods". These test sheets were evaluated with respect to their tensile strength (dry), breaking length (dry), tensile strength (wet), breaking length (wet) and relative tensile strength (wet), partially also with respect to their aldehyde and carboxy contents. The results are shown in Tables 2 through 5 below. Strength properties and aldehyde content are combined in Table 5 for some of the pulps investigated.

TABLE 1

Experimental Conditions

| Nr | Treatment Sequence | NaIO$_4$ | pH | TEMPO | NaOCl | pH |
|---|---|---|---|---|---|---|
| O* (ref.) | — | — | 4–5 | — | — | 8–8.3 |
| A* | P-25% - 5 h | 25% - 5 hrs | 4–5 | — | — | — |
| B* | P-25% - 25 h | 25% - 25 hrs | 4–5 | — | — | — |
| C* | P ref./4-OH | — | 4–5 | 4% | — | 4.5 |
| D* | P ref./AcAm | — | 4–5 | 1% | — | 8–8.3 |
| E | 4-OH/P-25% - 20 h | 25% - 20 hrs | 4–5 | 4% | 5% | 4.5 |
| F | AcAm/P-25% - 20 h | 25% - 20 hrs | 4–5 | 1% | 5% | 8–8.3 |
| G | AcAm/P5% - 25 h | 5% - 25 hrs | 4–5 | 1% | 5% | 8–8.3 |
| H | AcAm/P1%–25% | 1% - 25 hrs | 4–5 | 1% | 5% | 8–8.3 |
| I | AcAm/P1% - 25 h | 1% - 25 hrs | 4–5 | 1% | 3% | 8–8.3 |
| J | AcAm/P1% - 25 h | 1% - 25 hrs | 4–5 | 1% | 1% | 8–8.3 |

*comparative experiments
4-OH   4-OH TEMPO
AcAm   4-Acetamido TEMPO
P      Sodium periodate

TABLE 2

Results of Experiments A–F

| sample No. | weight of sheet [g] | basis weight [g/m$^2$] | thickness [mm] | tensile strength, dry [N/15 mm] | breaking length, dry [m] | tensile strength, wet [N/15 mm] | breaking length wet [m] | rel. tensile strength wet [%] |
|---|---|---|---|---|---|---|---|---|
| O | 1.4674 | 73.01 | 0.19 | 16.70 | 1524.9 | 0.10 | 9.1 | 0.6 |
| A* | 1.5803 | 78.62 | 0.23 | 16.17 | 1371.2 | 4.94 | 419.0 | 30.6 |
| B* | 1.5512 | 77.17 | 0.22 | 16.04 | 1385.7 | 5.28 | 456.2 | 32.9 |
| C* | 1.4801 | 73.64 | 0.17 | 19.78 | 1790.7 | 0.15 | 13.6 | 0.8 |
| D* | 1.5575 | 77.49 | 0.19 | 21.31 | 1833.4 | 0.15 | 12.9 | 0.7 |
| E | 1.6448 | 81.83 | 0.15 | 58.48 | 4764.3 | 23.73 | 1933.3 | 40.6 |
| F | 1.6136 | 80.82 | 0.15 | 59.47 | 4905.6 | 24.39 | 2011.9 | 41.0 |

*Comparative Experiment

TABLE 3

Results of Experiments G–J

| Sample No. | Basis weight [g/m$^2$] | Breaking length, dry [m] | Breaking length, wet [m] | Rel. tensile strength, wet [%] |
|---|---|---|---|---|
| O (Ref) | 79.7 | 1524.9 | 9.1 | 0.6 |
| G | 80.0 | 2639.8 | 770 | 29.2 |
| H | 81.4 | 2497.5 | 915.9 | 36.7 |
| I | 80.1 | 2581.9 | 927 | 35.9 |
| J | 79.9 | 2868.0 | 911.4 | 31.8 |

TABLE 4

Carboxylic Acids and Aldehydes Generated by a Combined Oxidation Technique. Total surface amounts of acids and aldehydes, respectively, are listed

| sample No. | Oxidation Sequence | tot. carb. acids content** µmol COOH/g | surf. carb. acids content** µmol COOH/g | total aldehydes content µmol CHO/g | surf. aldehydes content µmol CHO/g |
|---|---|---|---|---|---|
| Ref | — | 0 (51) | 0 (3.1) | 0 | 0 |
| A* | P-25%-5 hrs | 20 (71) | 0.6 (3.7) | 53 | 45.8 |
| E | 4-OH-T/P-25%-20 hrs | 34 (85) | 0 (3.1) | 267 | 145.4 |
| F | AcAm-T/P-25%-20 hrs | 115 (166) | 4.9 (8) | 315 | 146.7 |
| H | AcAm-T/P 1%-25 hrs | 15 (93) | 3.7 (6.2) | 146 | 16.1 |

*comparative experiment
**carboxylic acid content = acids generated by oxidation
( ) value indicates the absolute value in pulp, i.e. native + acids generated by oxidation

TABLE 5

Aldehydes and Carboxylic Acids Generated by a Combined Oxidation Technique from some Investigated Pulps and wet and dry Strength Properties of corresponding Handsheet Papers.

| sample No. | Oxidation Sequence | breaking length, dry [m] | breaking length, wet [m] | tot. carb. acids content** μmol COOH/g | surf. carb. acids content μmol COOH/g | total aldehydes content μmol CHO/g | surf. aldehydes content μmol CHO/g |
|---|---|---|---|---|---|---|---|
| Ref | — | 1524.9 | 9.1 | 0 | 0 | 0 | 0 |
| A* | P-25%-5 hrs | 1371 | 419.0 | 20 | 0.6 | 53 | 45.8 |
| E | 4-OH-T/ P-25%-20 hrs | 4764 | 1933.3 | 34 | 0 | 267 | 145.4 |
| F | AcAm-T/ P-25%-20 hrs | 4906 | 2011.9 | 115 | 4.9 | 315 | 146.7 |

**see note of table 4

In the inventive experiments (E–J) a pulp was obtained which displays aldehyde functionalities at the C2, C3 and C6 positions of anhydroglucose units of the cellulosic chain, i.e. a trialdehyde. By means of a sodium periodate oxidation, as performed in comparative experiments A and B, aldehydes are only generated at position C2 and C3 of the cellulosic glucose unit, while the TEMPO oxidation is selective for the 6-hydroxy position of the cellulosic chain and initially generates aldehydes, and at a later stage of the reaction also generates carboxylic acid groups. The 4-OH-TEMPO oxidation generates mainly aldehydes, whereas 4-Acetamido-TEMPO may to a greater extent further oxidize the already formed C6-aldehydes to C6-carboxylic acids. (Comparative experiments C and D are reference experiments for the use of TEMPO derivatives per se, without primary oxidants under conditions where a disproportionation is usually not observed.)

The results from experiments with subsequent oxidation with TEMPO (4-OH-TEMPO or Acetamido-TEMPO) and sodium periodate show that very high levels both of dry strength and wet strength can be obtained by combining these two oxidation techniques. The degree of improvement is surprising.

Especially experiment E and F show a very high surface aldehyde content, which seems to be important for developing a particularly high wet tensile strength.

What is claimed is:

1. A cellulosic fibrous material comprising cellulose with functional groups, wherein said groups are aldehyde groups formed at positions C2 and C3 as well as at position, C6 of anhydroglucose units of the cellulose and wherein the cellulosic fibrous material has a dry breaking length of at least 1000 meters.

2. The cellulosic fibrous material according to claim 1, wherein two secondary OH groups and the primary OH group of an anhydroglucose unit of a cellulose chain comprise a plurality of consecutive anhydro sugar units not oxidized into aldehyde groups, but a partial oxidation has taken place.

3. The cellulosic fibrous material according to claim 1, wherein said cellulose comprises secondary hydroxyl groups and are oxidized into aldehyde groups at least in part by means of TEMPO oxidation and periodate oxidation.

4. The cellulosic fibrous material according to claim 1, wherein said cellulosic fibrous material is in the form of tissue paper.

5. The cellulosic fibrous material according to claim 1, wherein said cellulosic fibrous material is in the form of pulp.

6. The cellulosic fibrous material according to claim 1, wherein the total number of aldehyde groups is 1.5 times greater than the total number of carboxyl groups.

7. The cellulosic fibrous material according to claim 1, wherein the total number of aldehyde groups is more than 50 μmol aldehyde/g.

8. The cellulosic fibrous material according to claim 1, wherein the total number of aldehyde groups is more than 75 μmol aldehyde/g.

9. The cellulosic fibrous material according to claim 1, wherein the total number of aldehyde groups is more than 100 μmol aldehyde/g.

10. A method for making a cellulosic fibrous material, comprising:
    oxidizing said cellulosic fibrous material in order to generate aldehyde functions at position C6 of a cellulosic chain within the material,
    filtering off and washing the oxidized cellulosic fibrous material, and
    oxidizing said cellulosic fibrous material in order to generate aldehyde functions at position C2 and/or C3 of a cellulosic chain within the material, and
    wherein said cellulosic fibrous material comprises a polysaccharide-based composition with functional groups, wherein said groups are aldehyde groups formed at positions C2 and/or C3 as well as at position C6 of an anhydroglucose units of the polysaccharide material and wherein the cellulosic fibrous material has a dry breaking length of at least 1000 meters.

11. The method according to claim 10, wherein in the step of oxidizing the cellulosic fibrous material in order to generate aldehyde functions at position C6 of a cellulosic chain within the material, the oxidation occurs by means of 4-hydroxy-TEMPO or 4-Acetamido-TEMPO in an amount of 0.5 to 10.0 wt % based on the dry weight of the fibrous material, in the presence of NaOCl in an amount of 0.1 to 5 wt %, based on the dry weight of the fibrous material.

12. The method according to claim 10, wherein the oxidizing step is conducted at a ph of 2 to 10 and at a temperature of 5 to 60° C.

13. The method according to claim 10, wherein in the step of oxidizing the cellulosic fibrous material in order to generate aldehyde functions at positions C2 and/or C3 of a cellulosic chain within the material, the oxidation occurs by means of sodium periodate in an amount of 1 to 25 wt %, based on a dry weight of the fibrous material.

14. The method according to claim 13, wherein the oxidizing step is conducted at a pH of 2 to 6 and a temperature of 10 to 60° C.

15. The method according to claim 10, wherein in the step of oxidizing the cellulosic fibrous material in order to generate aldehyde functions at position C6 of a cellulosic chain within the material, the oxidation occurs by means of 4-hydroxy-TEMPO or 4-Acetamido-TEMPO.

16. The method according to claim 10, wherein in the step of oxidizing the cellulosic fibrous material in order to generate aldehyde functions at positions C2 and/or C3 of a cellulosic chain within the material, the oxidation occurs by means of sodium periodate.

17. A method for making a cellulosic fibrous material, comprising:
    oxidizing said cellulosic fibrous material in order to generate aldehyde functions at position C6 of a cellulosic chain within the material, the oxidation occurs by means of 4-hydroxy-TEMPO or 4-Acetamido-TEMPO in an amount of 0.5 to 10.0 wt % based on the dry weight of the fibrous material, in the presence of NaOCl in an amount of 0.1 to 5 wt %, based on the dry weight of the fibrous material.
    filtering off and washing the oxidized cellulosic fibrous material, and
    oxidizing said cellulosic fibrous material in order to generate aldehyde functions at position C2 and/or C3 of a cellulosic chain within the material, the oxidation occurs by means of sodium periodate in an amount of 1 to 25 wt %, based on a dry weight of the fibrous material, and
    wherein said cellulosic fibrous material comprises a polysaccharide-based composition with functional groups, wherein said groups are aldehyde groups formed at positions C2 and/or C3 as well as at position C6, of an anhydroglucose units of the polysaccharide material and wherein the cellulosic fibrous material has a dry breaking length of at least 1000 meters.

18. A method for making a cellulosic fibrous material, comprising:
    oxidizing said cellulosic fibrous material in order to generate aldehyde functions at position C(6) of a cellulosic chain within the material,
    filtering off and washing the oxidized cellulosic fibrous material, and
    oxidizing said cellulosic fibrous material in order to generate aldehyde functions at position C(2) and C(3) of a cellulosic chain within the material, and
    wherein said cellulosic fibrous material comprises a polysaccharide-based composition with functional groups, wherein said groups are aldehyde groups formed at positions C2, C3 and,C6 position of an anhydroglucose unit of the polysaccharide material and wherein the cellulosic fibrous material has a dry breaking length of at least 1000 meters.

* * * * *